United States Patent

Davies

[15] 3,681,493
[45] Aug. 1, 1972

[54] ANTIBACTERIAL COMPOSITIONS

[72] Inventor: Gareth Morse Davies, Macclesfield, England

[73] Assignee: Imperial Chemical Industries Limited, London, England

[22] Filed: Sept. 28, 1970

[21] Appl. No.: 76,215

[30] Foreign Application Priority Data

Oct. 14, 1969  Great Britain..............50,469/69

[52] U.S. Cl.................................................424/185
[51] Int. Cl. .............................................A61k 27/00
[58] Field of Search.......................................424/185

[56] References Cited

OTHER PUBLICATIONS

Roth et al., Archiv dev Phavmazie, Vol. 297, No. 9, 1964, pages 513– 523.

*Primary Examiner*—Jerome D. Goldberg
*Attorney*—Cushman, Darby and Cushman

[57] ABSTRACT

The invention provides pharmaceutical and veterinary compositions including as active ingredient a known derivative of di-(2-thienyl)borinic acid or phenyl-2-thienylborinic acid, for use in the treatment of bacterial infections, particularly those caused by Gram-negative bacteria.

7 Claims, No Drawings

ANTIBACTERIAL COMPOSITIONS

This invention relates to pharmaceutical and veterinary compositions which possess antibacterial activity.

According to the invention there is provided a pharmaceutical or veterinary composition comprising isobutyl or 8-quinolyl di-(2-thienyl)-borinate, or isobutyl or 8-quinolyl phenyl-(2-thienyl)borinate and a pharmaceutically or veterinarily acceptable diluent or carrier.

The compositions which include isobutyl di-(2-thienyl)borinate and isobutyl phenyl-(2-thienyl)borinate are less stable and less convenient for routine pharmaceutical or veterinary use, and preferred compositions of the invention are those which include 8-quinolyl di-(2-thienyl)borinate and 8-quinolyl phenyl-(2-thienyl)borinate.

The composition may be in a form suitable for oral administration, for example a tablet, capsule, solution or suspension in an aqueous or non-aqueous medium, or an emulsion.

The composition may also be in a form suitable for parenteral administration, for example a sterile injectable solution, suspension or emulsion.

Tablets may be made by admixture of either 8-quinolyl di-(2-thienyl)-borinate or 8-quinolyl phenyl-(2-thienyl)borinate with conventional pharmaceutical excipients, for example inert diluents such as calcium carbonate, lactose or maize starch, binding agents such as starch or gelatin, disintegrating agents such as maize starch or alginic acid and lubricating agents such as magnesium stearate, stearic acid or talc, followed by compression of the mixture into tablets containing 50, 100, 250, or 500 mg. of the active ingredient in the conventional manner.

Capsules may be in the form of gelatin capsules containing 50, 100, 250 or 500 mg. of either of the above-mentioned compounds, either alone or mixed with an inert diluent, for example lactose or starch.

Solutions, suspensions or emulsions for oral administration may contain flavoring or sweetening agents, and the aqueous suspensions may contain suspending or thickening agents, such as sodium carboxymethyl cellulose, or wetting agents such as polyoxyethylene sorbitan monolaurate, and preferably contain from 0.5 to 5 percent of the active ingredient.

Solutions, suspensions or emulsions for parenteral administration may contain similar excipients to those used for the preparation of orally administrable solutions, suspensions or emulsions, and they may be sterilized by conventional methods, and preferably contain from 0.5 to 5 percent of the active ingredient.

As stated above, the compositions of the invention possess in vitro and in vivo antibacterial activity, as demonstrated in vitro by their inhibiting the growth of, for example, *Staphylococcus aureus*, *Salmonella dublin*, *Proteus vulgaris*, *Escherichia coli* and other strains of Gram-negative pathogenic organisms in a standard, serial-dilution assay, and demonstrated in vivo by the increase in the survival time of mice which are infected with such bacteria, and especially Gram-negative bacteria, and are treated with a composition of the invention, as compared with infected mice which are not so treated. The compositions of the invention are useful for the treatment of bacterial infections, particularly infections caused by Gram-negative bacteria such as, for example, *Salmonella dublin*, in man and animals.

The compositions of the invention are at least as effective as compositions containing chloramphenicol against a range of bacteria, including *Salmonella dublin*, *Klebsiella pneumoniae*, and *Escherichia coli*, and are used clinically in the same way as compositions of this well-known antibacterial drug. That is to say, the usual dose in man is from 1 to 3 g. orally or parenterally daily, normally in divided doses two or three times per day.

The compositions may also contain other known antibacterial agents, for example tetracyclines, penicillins, fusidic acid or sulphonamides, or they may be used in conjunction with such known antibacterial agents.

Isobutyl di-(2-thienyl)borinate and isobutyl phenyl-(2-thienyl)-borinate may be obtained by reacting tri-isobutylborate with, respectively, two equivalents of the Grignard reagent derived from 2-iodothiophen, or successively one molecular equivalent of phenyl magnesium bromide and one molecular equivalent of the Grignard reagent derived from 2-iodothiophen; and 8-quinolyl di-(2-thienyl)borinate and 8-quinolyl phenyl-(2-thienyl)borinate may be obtained by reacting the corresponding isobutyl ester with 8-hydroxyquinoline, as described more fully by H.J. Roth and B. Miller in Archiv der Pharmazie, 1964, volume 297, pages 513 to 523.

The invention is illustrated but not limited by the following examples:

EXAMPLE 1

An intimate mixture of 8-quinolyl di-(2-thienyl)borinate (33 percent by weight), maize starch (22.5 percent by weight), calcium phosphate (44 percent by weight) and magnesium stearate (0.5 percent by weight) is compressed, and the compressed mixture is then broken down into granules by passage through a 16-mesh screen. The resultant granules are then compressed into tablets which each contain 100 mg. of the active ingredient. There are thus obtained tablets suitable for oral use for therapeutic purposes.

The 8-quinolyl di-(2-thienyl)borinate may be replaced by a equipotent quantity of 8-quinolyl phenyl-(2-thienyl)borinate to give tablets suitable for administration to humans for therapeutic purposes.

EXAMPLE 2

8-quinolyl di-(2-thienyl)borinate is mixed with an inert diluent (lactose or kaolin) and is granulated with a binding agent (gelatine solution, starch paste or acacia mucilage). A disintegrating agent (maize starch, diatomite or alginic acid) is mixed with the granules, and a lubricating agent (stearic acid or talc) is added. The mixture is then compressed into tablets which contain 50, 100, or 250 mg. of 8-quinolyl di-(2-thienyl)borinate, suitable for oral use for therapeutic purposes.

A typical tablet has the following composition:

| | |
|---|---|
| 8-quinolyl di-(2-thienyl)borinate | 250mg. |
| lactose | 220mg. |
| maize starch | 25mg. |
| 10% aqueous gelatine solution | 5mg. |
| talc | 3mg. |

EXAMPLE 3

The following is a typical formulation to provide capsules, suitable for oral use for therapeutic purposes, according to standard pharmaceutical technique:

| | |
|---|---|
| 8-quinolyl di-(2-thienyl)borinate | 250mg. |
| lactose | 27mg. |
| talc | 3mg. |

The ingredients are passed through a 60 mesh seive, and then mixed together for 15 minutes. The mixture is then filled into soft gelatin capsules, so that each contains 280 mg. of the mixture corresponding to 250 mg. of the active ingredient.

EXAMPLE 4

A mixture having the composition

| | |
|---|---|
| 8-quinolyl di-(2-thienyl)borinate | 2% by weight |
| liquid paraffin | 10% by weight |
| soft white paraffin | 88% by weight | is prepared by adding the active ingredient to a stirred mixture of the paraffins heated at 65°C. The mixture is allowed to cool and the stirring is continued until the mixture is cool. There is thus obtained an ointment suitable for topical application for therapeutic purposes.

EXAMPLE 5

100 parts of 8-quinolyl di-(2-thienyl)borinate are milled to a fine powder, sterilized by conventional techniques, and mixed with 10 parts of sterile, finely-powdered sodium carboxymethylcellulose. The powder is thoroughly mixed together with 50 parts of a sterile, 2 percent w/v solution of polyoxyethylenesorbitan mono-oleate in water, and the resulting mixture is then dried. The dry, sterile product is introduced into vials, so that each vial contains 100 mg. of the active ingredient, and the vials are sealed. Addition of 2 ml. of sterile water to such a vial, followed by shaking, produces a sterile 5 percent suspension of 8-quinolyl di-(2-thienyl)borinate, suitable for parenteral administration for therapeutic purposes.

What we claim is:-

1. An antibacterial pharmaceutical or veterinary composition in the form of a tablet, a capsule or a sterilized solution, suspension or emulison for parenteral use comprising an antibacterially effective amount of isobutyl or 8-quinolyl di-(2-thienyl)borinate, or isobutyl or 8-quinolyl phenyl-(2-thienyl)borinate and a major amount of a pharmaceutically or veterinarily acceptable diluent or carrier.

2. A composition as claimed in claim 1 which includes 8-quinolyl di-(2-thienyl)borinate or 8-quinolyl phenyl-(2-thienyl)borinate.

3. A composition as claimed in claim 1 which is a tablet or capsule containing 50, 100, 250 or 500 mg. of active ingredient.

4. A composition as claimed in claim 1 or 2 containing from 0.5 to 5 percent of the active ingredient.

5. A composition as claimed in claim 1 which is a sterilized solution, suspension or emulsion for parenteral use containing from 0.5 to 5 percent of the active ingredient.

6. A method for the treatment of a bacterial infection in man or animals which comprises the administration of an antibacterially effective amount of isobutyl or 8-quinolyl di-(2-thienyl) borinate, or isobutyl or 8-quinolyl phenyl-(2-thienyl)-borinate to man or animals in need of such treatment.

7. A method as claimed in claim 6 wherein the infection is caused by Gram-negative bacteria.